US011505228B2

(12) United States Patent
Raninen et al.

(10) Patent No.: US 11,505,228 B2
(45) Date of Patent: Nov. 22, 2022

(54) CASTER ASSEMBLY, A CHASSIS COMPRISING SUCH AN ASSEMBLY, AND A ROLL CONTAINER COMPRISING SUCH A CHASSIS (71) Applicant: K. Hartwall Oy Ab, Söderkulla (FI)

(72) Inventors: Jussi Raninen, Söderkulla (FI); Mikko Järvi, Söderkulla (FI); Juha Kosonen, Söderkulla (FI)

(73) Assignee: K. Hartwall Oy Ab, Söderkulla (FI)

( * ) Notice: Subject to any disclaimer, the term of this patent is extended or adjusted under 35 U.S.C. 154(b) by 113 days.

(21) Appl. No.: 16/982,893

(22) PCT Filed: Mar. 18, 2019

(86) PCT No.: PCT/FI2019/050224
§ 371 (c)(1),
(2) Date: Sep. 21, 2020

(87) PCT Pub. No.: WO2019/180315
PCT Pub. Date: Sep. 26, 2019

(65) Prior Publication Data
US 2021/0001909 A1 Jan. 7, 2021

(30) Foreign Application Priority Data
Mar. 21, 2018 (FI) .................................. 20185267

(51) Int. Cl.
B62B 3/00 (2006.01)
B60B 33/00 (2006.01)
(52) U.S. Cl.
CPC .......... B62B 3/002 (2013.01); B60B 33/0005 (2013.01); B60B 33/0063 (2013.01);
(Continued)

(58) Field of Classification Search
CPC . B62B 3/002; B62B 2301/04; B60B 33/0005; B60B 33/0063; B60B 33/0039;
(Continued)

(56) References Cited

U.S. PATENT DOCUMENTS 3,953,047 A * 4/1976 Morgan .................... B62B 3/16
D34/17
3,977,689 A * 8/1976 Rosa ....................... B62B 3/186
280/33.996
(Continued)

FOREIGN PATENT DOCUMENTS

DE 2333453 A1 * 6/1973
DE 19946160 A1 3/2001
(Continued)

OTHER PUBLICATIONS

Australian Examination Report Re: Application No. 2019239822, dated Oct. 1, 2020.
(Continued)

Primary Examiner — Jacob B Meyer
(74) Attorney, Agent, or Firm — Chernoff, Vilhauer, McClung & Stenzel, LLP (57) ABSTRACT According to an example aspect of the present disclosure, there is provided a novel caster assembly for a roll container (1000). The caster assembly has a caster (410) with a fork (411) as well as a pin (414). The pin (414) may be repeatedly attached to and removed from the fork (411) so as to attach the chassis (100) of the roll container (1000) to the fork (411). The pin (414) also acts as the hinge pin of a pivotable side wall (200) of said roll container (1000).

18 Claims, 7 Drawing Sheets (52) U.S. Cl.
CPC ....... *B60B 33/0039* (2013.01); *B60B 33/0047* (2013.01); *B60B 2200/43* (2013.01); *B60B 2900/531* (2013.01); *B60B 2900/541* (2013.01); *B62B 2301/04* (2013.01)

(58) Field of Classification Search
CPC ............ B60B 33/0047; B60B 2200/43; B60B 2900/531; B60B 2900/541
See application file for complete search history.

(56) References Cited

U.S. PATENT DOCUMENTS

| | | | | |
|---|---|---|---|---|
| 4,199,164 | A | * | 4/1980 | Sjoblom ................ B62B 3/186 220/255 |
| 4,222,579 | A | * | 9/1980 | Frydendal ............... B62B 3/004 280/33.996 |
| 4,735,330 | A | * | 4/1988 | Hoss .................. B65D 21/0215 220/6 |
| 7,374,186 | B2 | | 5/2008 | Mason et al. |
| 7,540,509 | B1 | | 6/2009 | Boraas et al. |

FOREIGN PATENT DOCUMENTS

| | | | | | |
|---|---|---|---|---|---|
| EP | 0106703 | A2 | * | 4/1984 | |
| EP | 3020613 | A | | 5/2016 | |
| EP | 3020613 | A1 | | 6/2017 | |
| EP | 2851497 | B1 | * | 2/2022 | ............. E05D 15/06 |
| FR | 2591175 | A1 | * | 6/1987 | |
| FR | 2785251 | A1 | * | 5/2000 | ............. B62B 3/025 |
| GB | 2484550 | A | | 4/2012 | |
| JP | H0958481 | A | | 3/1997 | |
| JP | 10328244 | A | | 12/1998 | |
| JP | 2004249749 | A | | 9/2004 | |
| WO | 2015051721 | A1 | | 4/2015 | |
| WO | WO-2015051721 | A1 | * | 4/2015 | ............. B62B 3/186 |

OTHER PUBLICATIONS

Office Action in related Chinese Patent Application No. 201980020603.9 dated Feb. 28, 2022.

* cited by examiner

CASTER ASSEMBLY, A CHASSIS COMPRISING SUCH AN ASSEMBLY, AND A ROLL CONTAINER COMPRISING SUCH A CHASSIS

FIELD

The present disclosure relates to logistics equipment. In particular, the invention relates to wheeled platforms, i.e. roll containers, on which parceled goods are transported and stored temporarily.

BACKGROUND

Roll containers are a popular means of moving and temporary storage of goods. While there are a variety of different types of roll containers, a nesting type has achieved great popularity. The European standard for roll containers EN12674-1:1999 discloses the five main types of nesting roll containers, namely:
  the "A-frame chassis" type,
  the "Z-frame chassis" type,
  the "U-frame chassis" type,
  the "V-frame" type, and
  the "L-frame" type.

The "A-frame chassis" type has gained great popularity. As the name suggests, the type employs an A-shaped chassis in plan view. The "A-frame chassis" type may feature a back frame section with a rear wall extending laterally and integral side pieces, which are known as trombones, extending longitudinally, i.e. orthogonally to the rear wall. The rear casters are attached to the trombones and the front casters are attached to the chassis. "A-frame chassis" roll containers also comprise a liftable base which is hinged to the back frame section of the container. Some "A-frame chassis" models, however, do not feature a rear wall or trombones. In such an open rear configuration, the base may be simply carried by the side walls and the side walls are pivotably attached to the forks of the rear casters. In deployed state, the roll container has a prismatic form. In nesting state, the base is either turned back or to the side towards a vertical orientation or removed and potentially suspended from a side wall. With the base removed from the center, the side walls are then pivoted in and towards each other, wherein the front of the roll container is narrower than the rear. The achieved wedge-shaped is used to nest several roll containers to achieve a compact formation for return logistics. The volumetric efficiency of the roll container, on the other hand, serves the purpose of reducing the carbon footprint of logistics through efficiency in return logistics.

While the "A-frame chassis" roll container type is very efficient in view of return logistics, there still remains a long standing need to improve to further reduce the carbon footprint of logistics equipment.

SUMMARY

A novel caster assembly for a roll container is therefore proposed. The caster assembly has a caster with a fork as well as a pin. The pin may be repeatedly attached to and removed from the fork so as to attach the chassis of the roll container to the fork. The pin also acts as the hinge pin of a pivotable side wall of said roll container.

A chassis for a roll container is also proposed making use of such a caster assembly. The chassis a first arm and a second arm which are attached to the fork of a respective first and second such rigid caster assembly.

Further, a roll container is proposed making use of such a chassis. A first side wall of the roll container is attached at one end to a first such caster assembly and at a second end to another caster. A second side wall of the roll container is attached at one end to a second such caster assembly and at a second end to another caster.

The invention is defined by the features of the independent claims. Some specific embodiments are defined in the dependent claims.

Considerable benefits are gained with aid of the present proposition. The modular rigid caster assembly provides for assembly with elementary or no tools close to the end user of the roll container. By avoiding welding, the components of the assembly may be shipped packed efficiently in flat parcels. On the other hand, by assembling the caster assembly with repeatedly attached joints, a damaged rear caster, for example, can be replaced on site without sending the unit for repair welding. This, in turn, improves the overall volumetric efficiency of the life span of the roll container.

BRIEF DESCRIPTION OF THE DRAWINGS

In the following certain exemplary embodiments are described in greater detail with reference to the accompanying drawings, in which.

EMBODIMENTS

The use and construction of a modular fork assembly according to certain embodiments is discussed in connection with a roll container that has auxiliary components which are discussed first. The chassis, for example, has been engineered so as to be assembled and disassembled with minimal or no tools and which includes a sacrificial and/or suspending element for improved tolerance for impacts and/or handling.

The appended FIGURES illustrate one embodiment where an H-frame roll container 1000 is constructed making use of detachably interconnected components forming parts of the chassis 100. While the concept has been described as applied to an H-frame chassis 100, the same principles are equally applicable to other chassis constructions, chiefly to an A-frame chassis.

Figure 1:
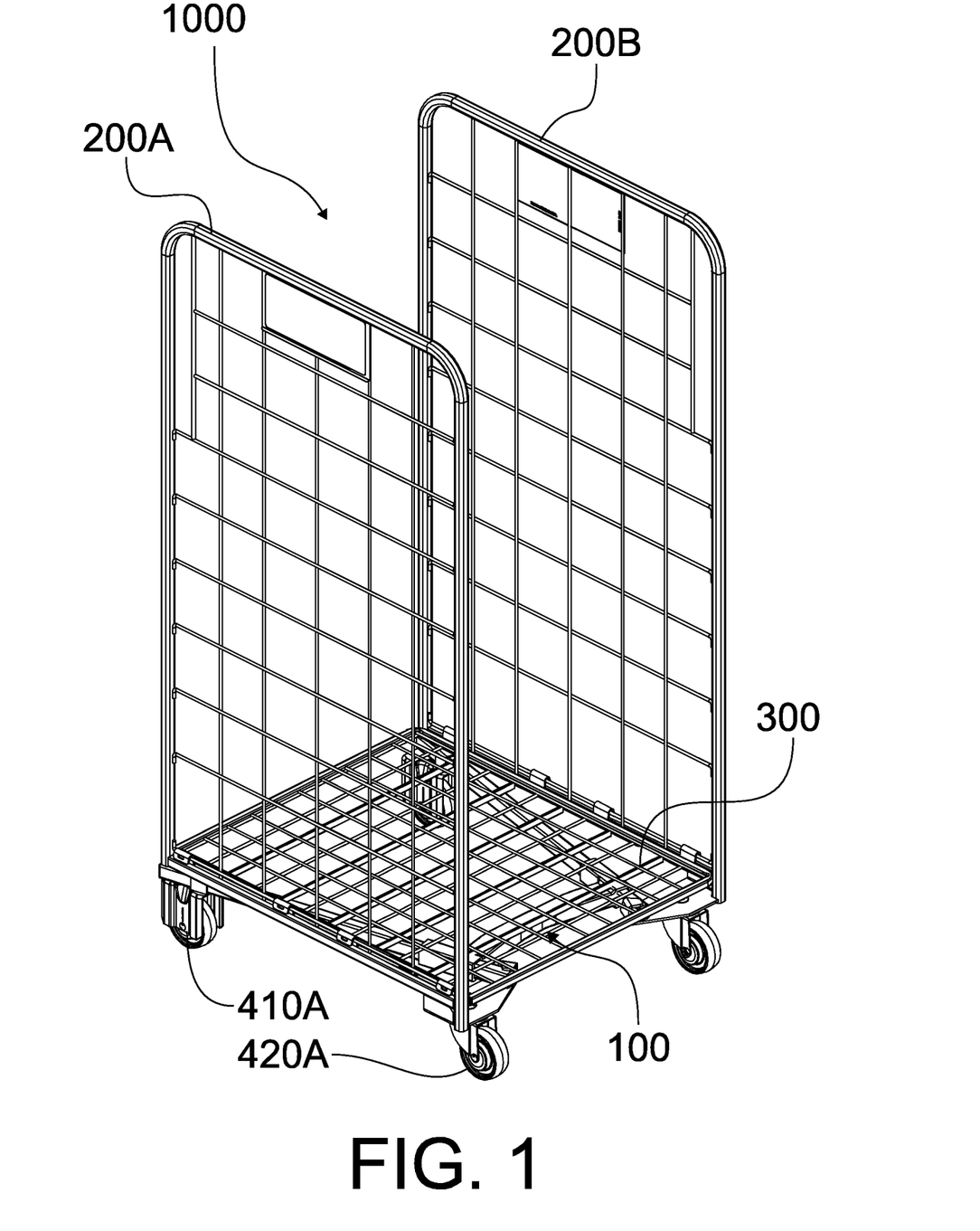
FIG. 1 illustrates a top perspective view of a roll container according to some embodiments.

FIG. 1 depicts a roll container 1000 featuring two side walls 200, namely a first side wall 200A and a second side wall 200B, on a chassis 100. The labels A and B are in this context used to distinguish between two different individual but similar components. The side walls 200 may feature, as shown, a conventional design with a peripheral frame delimiting a mesh. Naturally, alternative solid or lighter wall constructions are also foreseeable. The side walls 200 are spaced apart from each other in a dimension which is in this context referred to as a transversal dimension which is orthogonal to the main intended travelling dimension of the roll container 1000. A removable base 300 is suspended from the lower frame beams of the opposing side walls 200. The base 300 has a mesh structure and hooks for suspending the base 300 in a horizontal deployed configuration shown in the FIGURES or in a vertical stored configuration (not illustrated). The base is 300 further supported by the chassis 100 from below.

The roll container 1000 further includes four casters. Two of the casters provided to a first end of the roll container 1000, which in this context is referred to as the rear end for the sake of clarity, are rigid casters 410, i.e. non-turning casters. A first rigid caster 410A is attached to the rear end of the first side wall 200A and a second rigid caster 410B is attached to the rear end of a second side wall 200B. The other two of the casters provided to a second end of the roll container 1000, which in this context is referred to as the front end, are swivel casters 420, i.e. turning casters. A first swivel caster 420A is attached to the front end of the first side wall 200A and a second swivel caster 420B is attached to the front end of a second side wall 200B. The caster configuration may be varied by, for example, having only swivel or only rigid casters or any combination thereof. The first rigid caster 410A and first swivel caster 420A form a first pair of casters which carries the first side wall 200A. The casters 410A, 420A of the first pair of casters are arranged at a distance from one another in the longitudinal dimension of the roll container 1000. The second rigid caster 410B and second swivel caster 420B form a second pair of casters which carries the second side wall 200B. The casters 410B, 420B of the second pair of casters are arranged at a distance from one another in the longitudinal dimension of the roll container 1000. The second side wall 200B is therefore arranged at a distance from the first side wall 200A in the transversal dimension of the roll container 1000.

Figure 2:
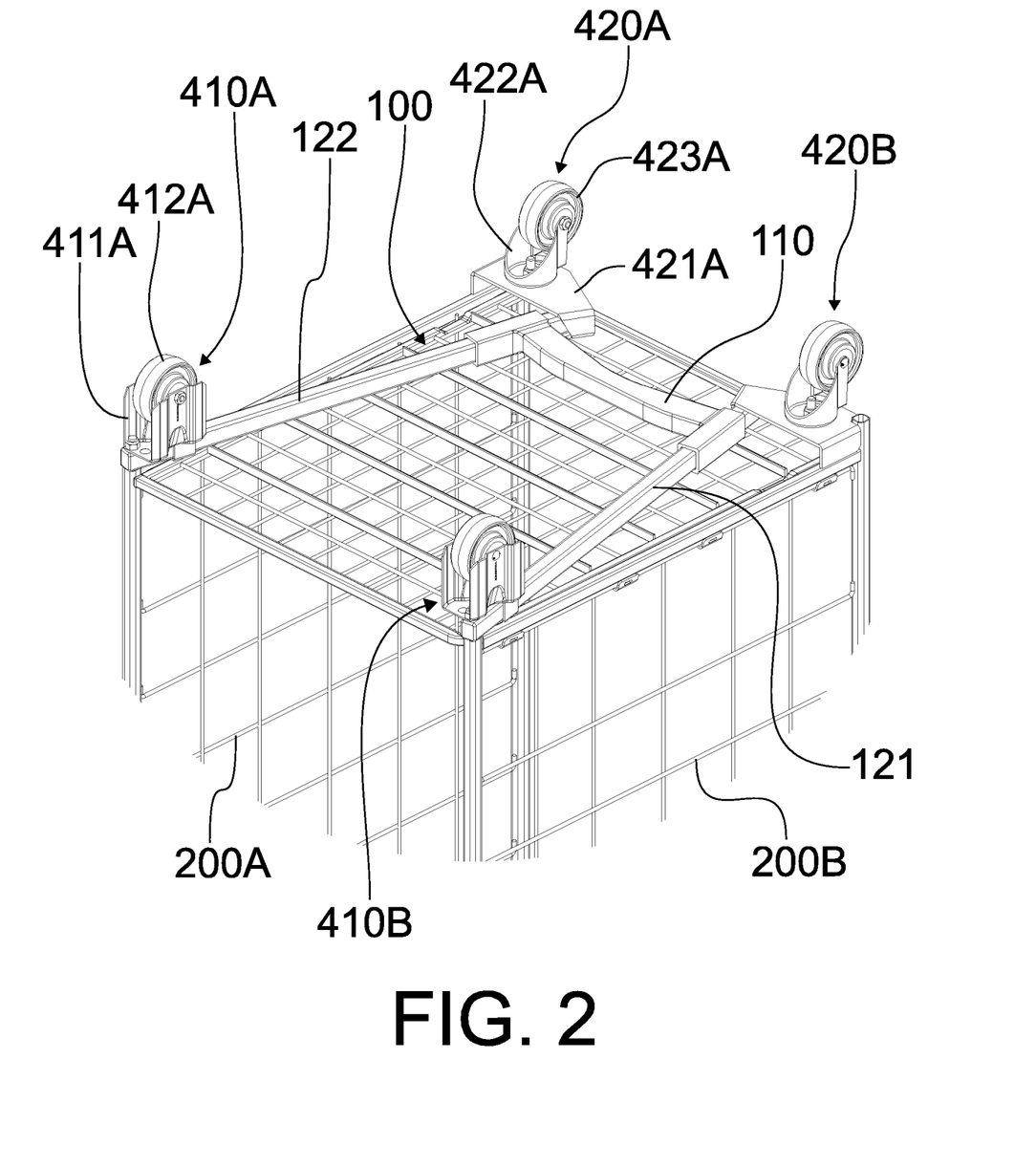
FIG. 2 illustrates a detail bottom perspective view of the roll container of FIG. 1.

FIG. 2 shows the roll container 1000 from below and reveals the design of the chassis 100 which is an H-frame chassis which is a modified version of an A-frame chassis as defined by the standard SFS-EN 12674-1 (Roll containers Part 1: Terminology, the July 1999 edition). Conventional A-frame chassis resembles the letter A in plan view, whereas an H-frame chassis resembles the letter H in plan view. The operating principle of an H-frame chassis roll container 1000 is that in the deployed state (shown in the FIGURES) the side walls 200 extend longitudinally. In the nesting state (not shown in the FIGURES) the side walls 200 are pivoted in respect of a vertical rear hinge so as to turn the front ends of the side walls 200 closer to one another. Such pivoted the side walls 200 form a V shape when viewed from above. This requires removal or turning of the base 300 into a vertical orientation. To achieve the nesting option, the roll container 1000 includes, on the one hand, a rear hinge, which will be discussed here after, and on the other hand swivel casters 420 which enable movement in respect to the chassis 100. As shown in FIG. 2, the wheel plates 421 of the swivel casters 420 are elongated in the transversal dimension. The wheel plate 421 terminates at the outer end to the side wall 200 and at the inner end to a lip for limiting the movement of the side wall 200 in respect to the chassis 100. Accordingly, the front end of the chassis 100 is supported by the wheel plates 421 of the swivel casters 420 so as to allow relative sliding movement between the chassis 100 and the swivel casters 420. The swivel caster 420 is fixed to the front end of the side wall 200. In the shown example the wheel plate 421 is fixed to the joint between the front upright and bottom horizontal piece of the frame of the side wall 200.

The fork 422 of the swivel caster 420 is, in turn, rotatably connected to the wheel plate 421 and houses the wheel 432.

Figure 3:
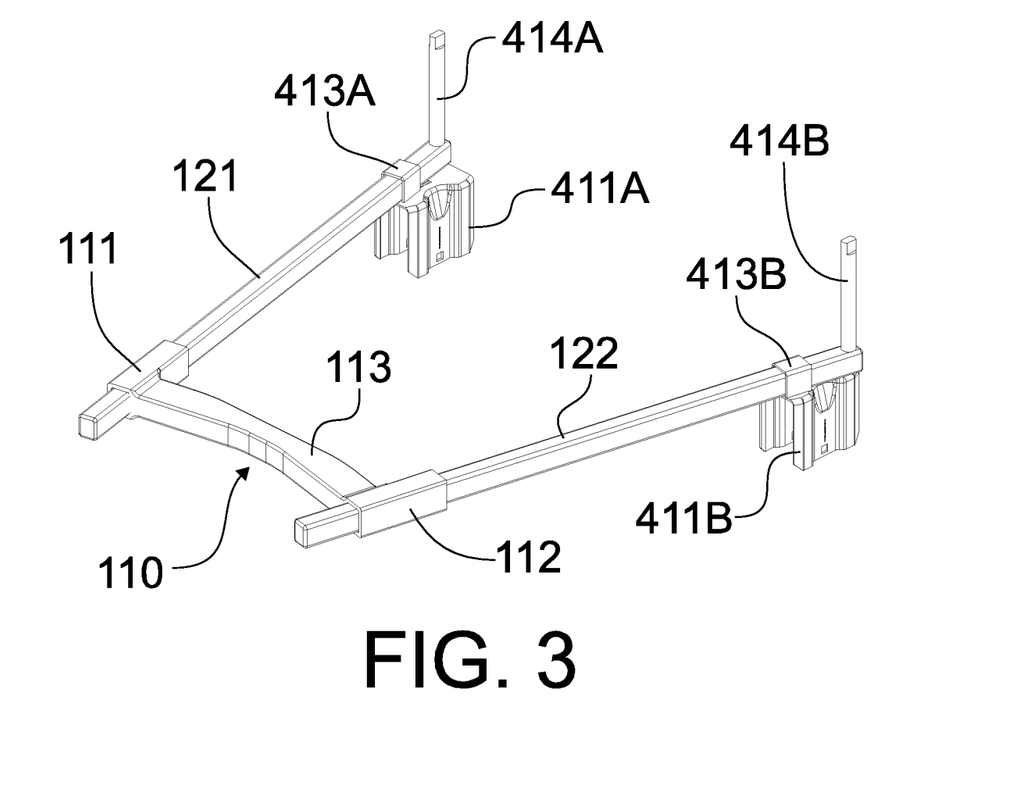
FIG. 3 illustrates a top elevation view of the chassis of the roll container of FIG. 1.

FIG. 3 depicts a focused representation of the chassis 100. The chassis 100 is to be understood as the stationary components on or to which movable components of the roll container 1000 are fitted. In the illustrated example, the movable components include the side walls 200, the swivel casters 420 and the wheels 412 of the rigid casters 410. The chassis 100 includes two arms, namely a first arm 121 and a second arm 122. The arms 121, 122 are arranged spaced apart from one another in the transversal dimension. The arms 121, 122 are also arranged non-parallel so as to open in a V angle towards the rear of the roll container 1000 so as to facilitate the nesting state when the front ends of the side walls 200 are pivoted towards one another. The arms 121, 122 may have, as illustrated, an elongated quadrangular and hollow profile. Alternatively solid arms having a similar or different profile, such as circular, oval, hexagonal. Also, any combinations of hollow and solid profiles having different shapes are foreseeable. The arms 121, 122 may be made of metal, such as steel or an aluminium alloy, plastics, composites, etc.

The arms 121, 122 are connected, preferably on the front half of the arms 121, 122, by a crossmember 110. The crossmember 110 is formed to be less resistant to mechanical strain than that of the first and second arm 121, 122. This means that the crossmember 110 is made to more easily elastically deform than the arms 121, 122 or that it is formed as a sacrificial member having lower structural strength than the arms 121, 122 or both. It is preferable that threshold for elastic deformation of the crossmember 110 is set considerably than that of the arms 121, 122 so that the crossmember 110 of the chassis 100 will flex upon impact rather than the arms 121, 122. It is also preferable that threshold for plastic deformation of the crossmember 110 is set considerably lower than that of the arms 121, 122 so that the crossmember 110 of the chassis 100 will distort or break upon impact rather than the arms 121, 122. The difference in mechanical resistance may be established by selecting the material of the crossmember 110 to withstand less stress than that of the arms 121, 122. The crossmember 110 may be of, for example, a polymer, such as polyamide, or a composite, such as glass or carbon fibre reinforced polyamide, polyethylene, or polypropylene. The material should, however, preferably withstand impacts enough so as to maintain integrity. Alternatively or additionally, the crossmember 110 may be made of a thinner profile than the arms 121, 122 to achieve the same result. With the crossmember 110 made more elastic than the arms 121, 122 the roll container 1000 is improved in two ways. Firstly, the relatively elastic crossmember 110 will absorb much of the mechanical strain thus minimizing the risk of replacing the arms 121, 122 which may be made from a more expensive material. Secondly, the relatively elastic crossmember 110 will enable flexing of the roll container 1000 on uneven surfaces thus keeping the wheels 412, 422 against the supporting surface. According to a further embodiment, the resistance against flexing in one dimension may be different to resistance in another dimension. For example, the crossmember may be made from a composite material having fibres arranged such that flexing may relatively easily occur about one axis and hindered in about another axis. This means that the crossmember may flex about an axis extending horizontally in the main travelling direction of the dolly but be prevented about a vertical axis or vice versa. Additionally or alternatively, the design of the crossmember may include additional supports for establishing the same effect.

According to an alternative embodiment, the materials and/or mechanical properties of the arms and crossmember may be reversed. More particularly, the crossmember may be made of a relatively sturdy material whereas the arms are made of a sacrificial material flexing and/or breaking more easily than the crossmember.

Figure 4:
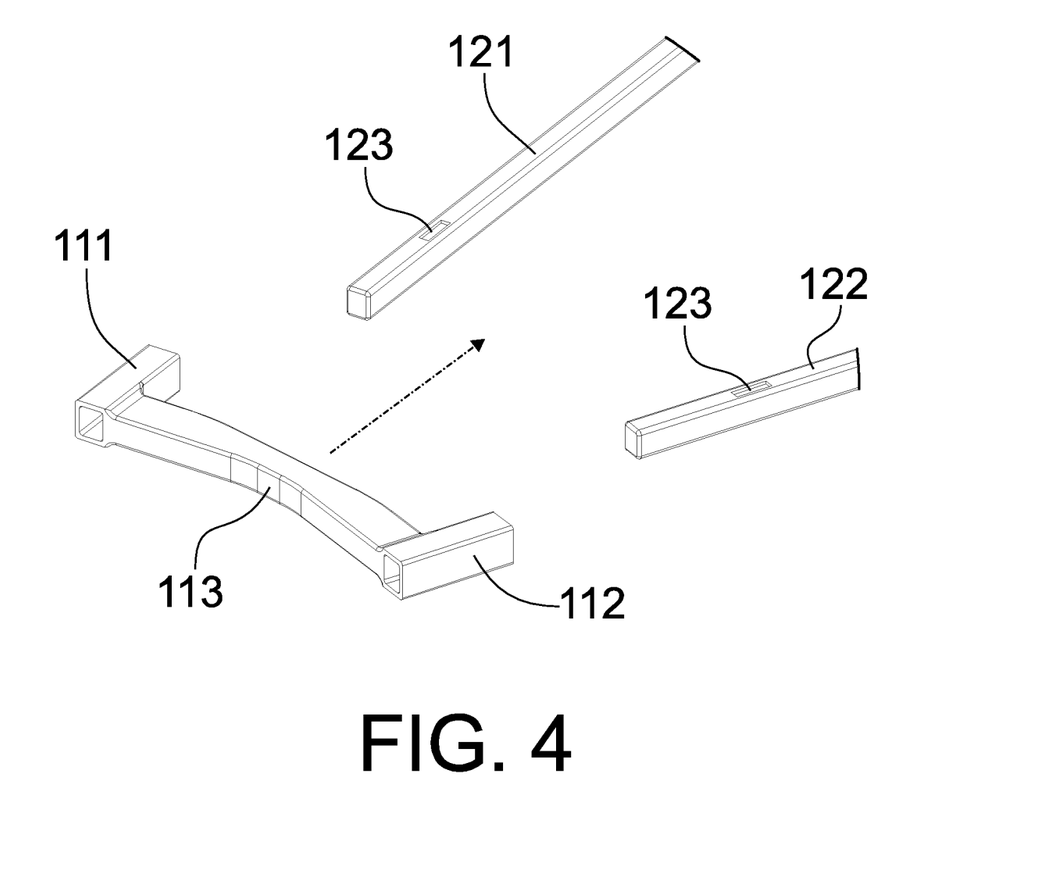
FIG. 4 illustrates a partial perspective explosion view of the chassis of FIG. 3.

The crossmember 110 has three sections, namely a first sleeve 111 for receiving the first arm 121, a second sleeve 112 for receiving the second arm 122, and a body 113 connecting the first sleeve 111 to the second sleeve 112. The sleeves 111, 112 are therefore aligned with the arms 121, 122 with the body 113 connecting the sleeves 111, 112 in the transversal dimension. The sleeves 111, 112 are hollow profiles designed to match that of the arms 111, 112 for receiving the arms 111, 112 in an enclosed manner. Due to the male-female fit between the sleeves 111, 112 and the arms 121, 122, the crossmember 110 can be repeatedly attached to and detached from the first and second arm 121, 122. The attachment can be a simple one as shown in the FIGURES, wherein the arms 121, 122 are simply slid into the sleeves 111, 112 (FIG. 4).

When the chassis 100 is assembled, it rides at the rear on the rigid casters 410 and at the front on the plate 421 of the swivel casters 420. To maintain rigidity, it is preferred that connection between the arms 121, 122 and the crossmember 110 is secured. The attachment of the arms 121, 122 to the sleeves 111, 112 may be secured by an interlocking coupling interface provided to the crossmember 110, the first arm 121, and to the second arm 122. The coupling interface features a female counterpart provided to the first and second arm 121, 122, which counterpart is an opening 123 in the FIGURES. Cooperating with the female counterpart is a respective male counterpart which may be a protrusion (not shown in the FIGURES) provided to the inner space delimited by the sleeve 111, 112. Naturally, the coupling interface may be reversed by adding a male counterpart on the arms and a receptive female counterpart to the sleeves (not shown in the FIGURES). Also, the entire fit between the crossmember 110 and the arms 111, 112 may be reversed by having pins at both ends of the body of the crossmember extending parallel to the arms and having a receptive opening on the arm (not shown in the FIGURES). The openings may be provided, for example, to the side surface of the arms that face each other when the chassis is assembled. If desired, the connection between the crossmember 110 and the arms 121, 122 may be further strengthened by a bolt or other detachable fastener (not shown in the FIGURES) in addition to or instead of the interlocking coupling interface. The fastener may, for example, penetrate the assembly through the fit between the crossmember and arms.

The sections of the crossmember 110, whether female (as shown) or male (as not shown), may be formed to be integral with the body, wherein the crossmember is a unitary piece, or the sections may be assembled through joints. It is, however, preferable that the crossmember 110 is cast as a unitary piece so as to maintain a continuous structure that provides consistent bending and strength properties.

The illustrated embodiments show the crossmember 100 forming part of an H-Frame chassis. It would similarly possible to form an A-frame chassis with a somewhat similar construction, with the modification that the arms 121, 122 do not extend through the sleeves 111, 112 as in the embodiment according to the FIGURES. In an A-frame embodiment the body 133 could be shaped to be slightly convex when viewed from the front. In the shown H-frame embodiment, the body 113 is shaped concave when viewed from the front.

The chassis 100 may be disassembled by removing the fit between the crossmember 110 and the arms 121, 122 in a reverse order in respect to assembly. By virtue of the several approaches above described for removably attaching the crossmember 110 to the first and second arm 121, 122, the chassis 100 may be easily assembled at the end use location with minimal or no tools and/or competence. This means that the components 110, 121, 122 of the chassis 100 can be shipped to the end use location not attached to each other, which enables efficient packing and thus helps reduce the carbon footprint of the roll container 1000 as compared to a welded structure. In addition, should the crossmember 110 sustain a mechanical failure, it will most likely fail before the arms 121, 122 are damaged. Accordingly, the roll container 1000 may be repaired in situ without shipping the container for welding.

The same goal of reducing the carbon footprint of the roll container 1000 may be improved additionally or alternatively by considering the hereafter described caster assembly.

At the rear the chassis 100 acts as the mounting point for the rear casters 410 and for hinge points for the side walls 200. Accordingly, the arms 121, 122 are attached at the rear to the rear fork 411 and to a hinge pin 414. In the illustrated embodiment, the rear caster 410 is a rigid caster, i.e. non-turning caster. It is foreseen to construct a similar rear end of the roll container 1000 with a swivel caster, i.e. turning caster, whereby it should be understood that the following description is equally applicable to a swivel caster construction. Additionally or alternatively, the front caster 420 may be replaced with a rigid caster. A swivel caster is, however, preferred at the front of the roll container so as to assist in the pivoting of the side walls about the rear hinges.

Figure 5:
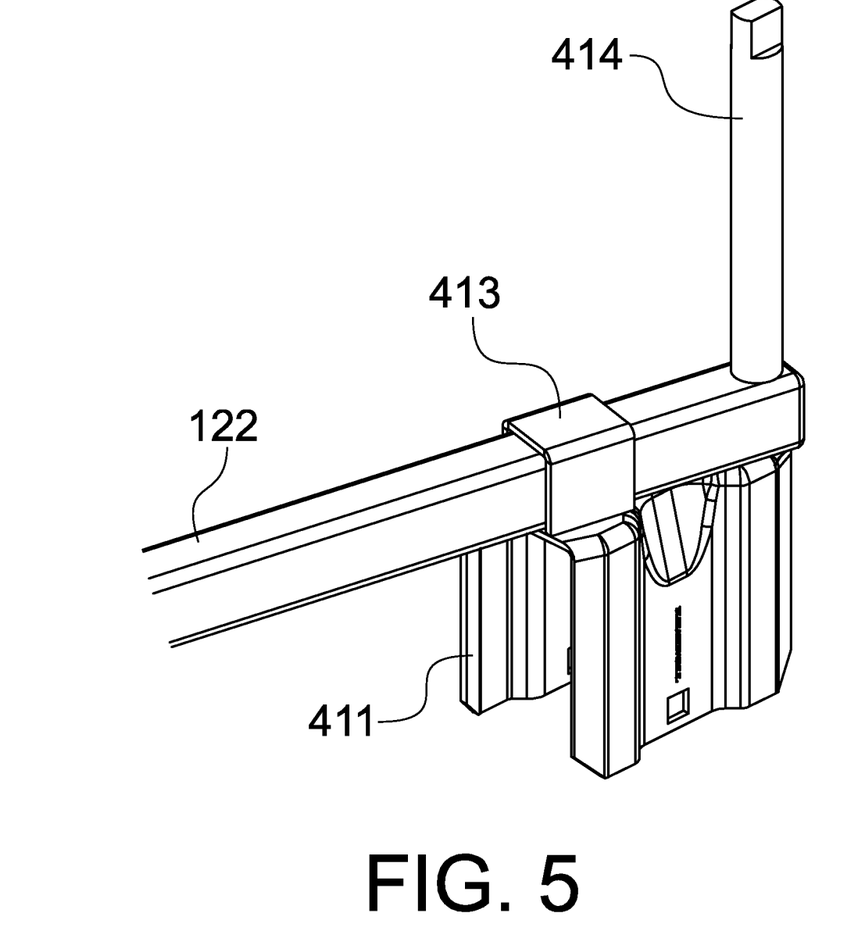
FIG. 5 illustrates a perspective detail view of the rigid wheel caster assembly of the chassis of FIG. 3.
Figure 6:
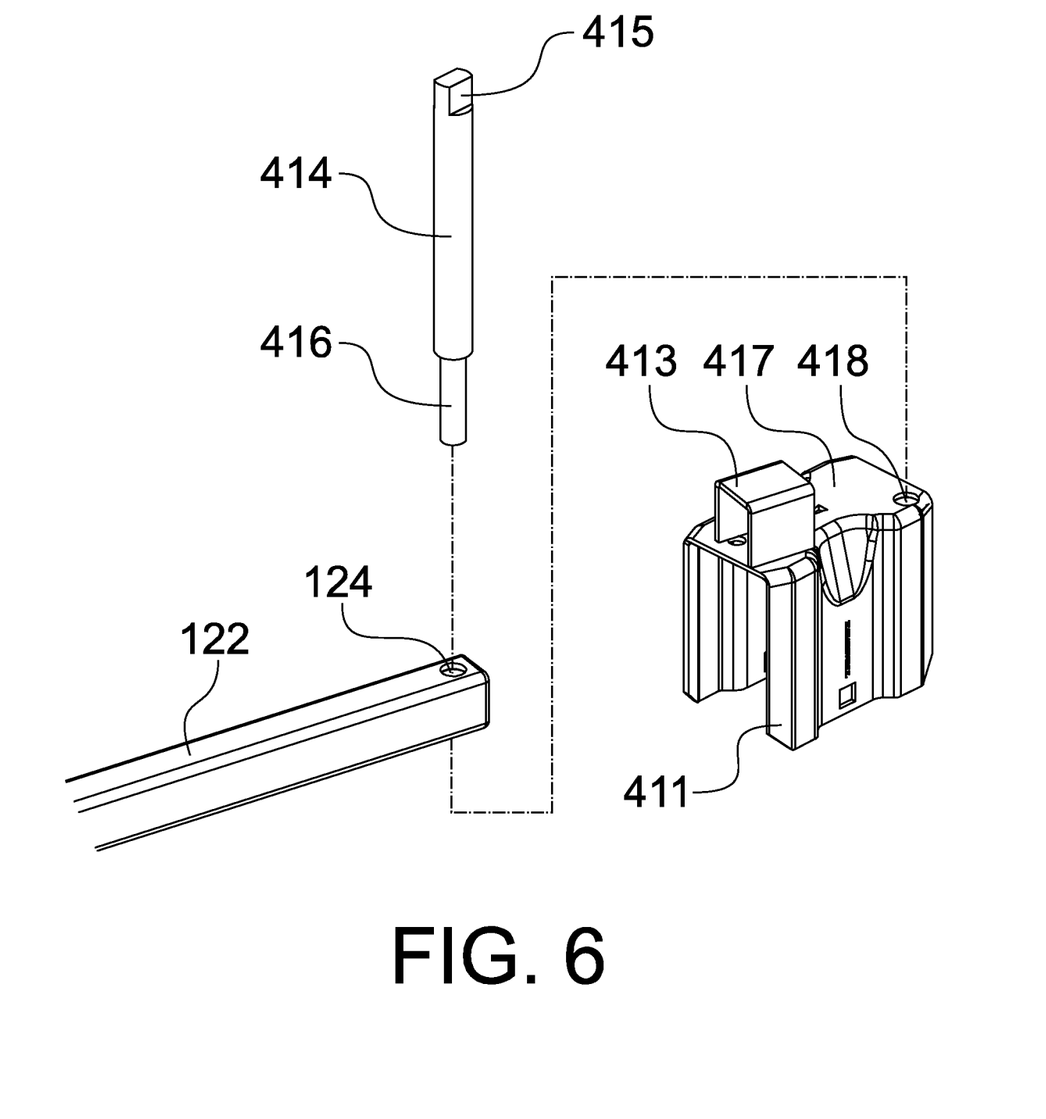
FIG. 6 illustrates an explosion view of the rigid wheel caster assembly of FIG. 5.
Figure 7:
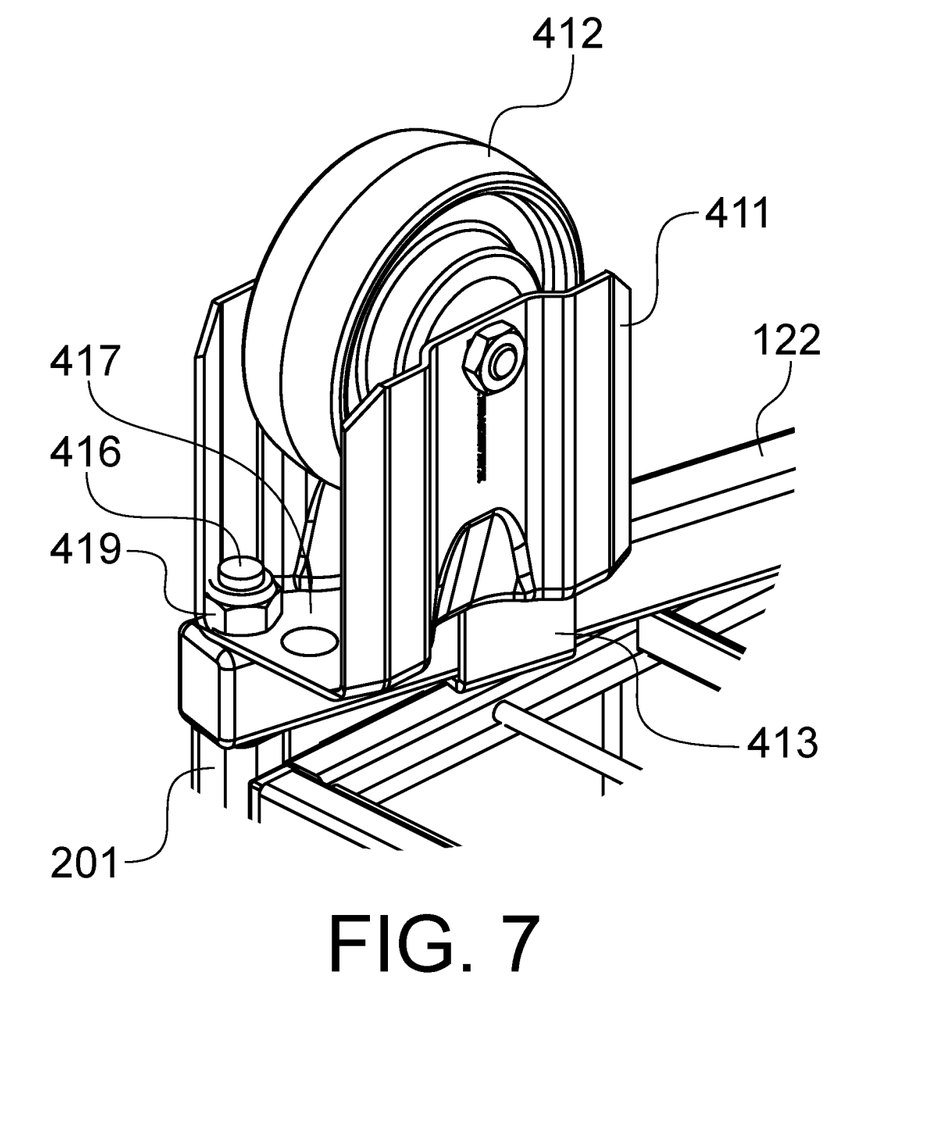
FIG. 7 illustrates a detail view of rigid wheel caster assembly of FIG. 2.

FIGS. 5 to 7 depict a focused representation of the caster assemblies attached to the rear of the chassis 100. The caster assemblies may include a rigid caster 410 as shown in the FIGURES or a swivel caster (not shown in the FIGURES). For illustrative purposes, the caster assembly is described by showing and referring to a rigid caster even though the same teachings are applicable to swivel casters. Similarly, for illustrative purposes, the interaction between the second arm 122 and the second rigid caster 410B is depicted, but the same teachings are applicable to the interaction between the first arm 121 and the first rigid caster 410A.

The rigid caster 410 includes a fork 411 which acts as a housing for the wheel 412 which has been omitted from FIGS. 5 and 6. The bottom end of the fork 411 includes an opening for receiving the axle of the wheel 412. The fork 411 features a top plate 417. The top plate 417 serves the purpose of acting as an attachment point for the arm 122 and hinge pin 414. The top plate 417 is preferably planar for receiving and carrying the planar bottom surface of the arm 122. The top plate 417 also has a bracket 413 for matching and keeping the therein inserted arm 122 attached to the fork 411. Alternatively the connection between the fork and arm may be another connection which allows axial displacement of the arm in respect to the fork but blocks other degrees of freedom. Such alternatives include fishtail and other positively locking shapes (not shown in the FIGURES). Preferably, the bracket 413 allows for axial displacement of the arm 122 but blocks other degrees of freedom thereof. The bracket 413 is therefore a rear sleeve for receiving the arm 122.

A pin 414 is attached to the fork 411. In the illustrated embodiment, the pin 414 has a dual purpose. Firstly, the pin 414 serves the purpose of forming the male counterpart of a hinge formed between the rear of the chassis 100 and the side wall 200. Secondly, the pin 414 serves the purpose of securing the arm 122 to the fork 411. FIG. 6 best illustrates one exemplary embodiment of the pin 414. The pin 414 may have an elongated body extending between a first end and a second end. The body may, for the most part, be cylindrical for promoting rotation around it.

The first end of the pin 414 has a tip 416 for attachment to the fork 411. The tip 416 is shaped to form a first coupling element of an interlocking coupling interface between the pin 414 and the fork 411. The second coupling element of the interlocking coupling interface between the pin 414 and the fork 411 may have several alternative manifestations depending on the first coupling element on the tip 414. The tip 416 may, for example, have an opening 418 with a male thread as the first coupling element. The top plate 417 of the fork 411, on the other hand, may have a corresponding female thread as the second coupling element for attaching the tip 416 to the top plate 417 through tightening rotation. The threaded connection may also be reversed with a threaded element protruding from the top plate and interconnecting with a threaded female opening at the end face of the tip (not shown in the FIGURES). Alternatively, as shown in the FIGURES, the opening 418 of the top plate 417 may be blind, wherein the pin 414 is attached to the top plate 417 with a nut 419 provided to the underside of the top plate 417 (FIG. 7). Alternatively, the pin 414 may be secured to the fork 411 in the axial dimension of the pin 414 by a transversal cotter pin extending through a receptive opening at the bottom end of the tip 416 on the underside of the top plate 417 (not shown in the FIGURES). Regardless of which of the disclosed or undisclosed interconnecting elements are selected, it is preferable for the fork 411 and the pin 414 to include cooperating coupling elements 419, 416 which form the interlocking coupling interface between the pin 414 and the fork 411.

As indicated above, the pin 414 blocks also the axial movement of the arm 122 in respect to the fork 411. In this context, the axial dimension of an element, such as the pin 414 or arm 122, refers to the dimension of greatest extension thereof. The rear end of the arm 122 has a through hole 124 which is designed to receive the tip 416 of the pin 414. The pin 414 therefore penetrates the arm 122 and the top plate 417 thus attaching the arm 122 to the fork 411 as illustrated by the dashed line of FIG. 6.

The pin 414 also includes a key 415 for rotating the pin 414 about its axial dimension. The key 415 is a shape which enables engagement with a corresponding tool for tightening the pin 414 against a corresponding threaded element which may be a threaded opening 418 or nut 419, for example, on the fork 411. According to the shown embodiment, the key 415 is located at the second end of the pin 414 opposing the tip 416. Alternatively, the key could be arranged somewhere between the first and second end, for example, in the middle of the body in the axial dimension. The key 415 exhibits two parallel sides so as to be engaged with a wrench. Alternatively, the second end of the pin 414 could feature a screwdriver socket, such as a Philips or torx socket, for engagement with a corresponding screwdriver head.

Returning the illustration of the chassis 100 shown by FIG. 3 it can be stated that both the first and the second arm 121, 122 are attached to the forks 411A, 411B of respective first and second rigid caster assemblies. The illustrated embodiment shows the caster assemblies being attached to the rear end of an H-frame chassis.

In addition to the pin 414 acting as a fastener for fastening the arms 121, 122 to the forks 411A, 411B, they act as hinge pins for the side walls 200A, 200B. For that purpose the first and second side wall 200A, 200B each comprise a hollow vertical profile which is designed to engage with the respective pin 414 on the first and second fork 411A, 411B so as to form the rear hinge of the roll container 1000. In the illustrated example, the rear upright profile of the frame of the side 200 includes a bottom opening through which the pin 414 is inserted upon assembly of the roll container 1000. Alternatively, the side wall 200 could feature a separate hinge block attached to the side of the frame profile.

With the proposed modular caster assembly the end user may assemble or repair the roll container with elementary or no tools. Accordingly, the components of the assembly may be shipped packed efficiently in flat parcels. On the other hand, by assembling the caster assembly with repeatedly attached joints, a damaged rear caster, for example, can be replaced on site without sending the unit for repair welding. This, in turn, improves the overall volumetric efficiency of the life span of the roll container.

In addition to the description above, further disclosures are made in the form of the following clauses.

$1^{st}$ clause: A chassis for a roll container, the chassis comprising a first arm, a second arm, and a crossmember configured to connect the first arm to the second arm so as to form a chassis, wherein the crossmember is formed to be less or more resistant to mechanical strain than that of the first and second arm and wherein the crossmember is configured to be repeatedly attached to and detached from the first and second arm.

$2^{nd}$ clause: The chassis according to the $1^{st}$ clause, wherein the crossmember is formed of a material which is less resistant to mechanical strain than that of the first and second arm.

$3^{rd}$ clause: The chassis according to the $1^{st}$ clause or the $2^{nd}$ clause, wherein the crossmember is made of a polymer, particularly polyamide or a composite material.

$4^{th}$ clause: The chassis according to the $1^{st}$ clause, the $2^{nd}$ clause, or the $3^{rd}$ clause, wherein the crossmember is cast as a unitary piece.

$5^{th}$ clause: The chassis according to any one of the preceding clauses, wherein the first and second arm are made of metal.

$6^{th}$ clause: The chassis according to any one of the preceding clauses, wherein the crossmember comprises a first sleeve for receiving the first arm, a second sleeve for receiving the second arm, and a body connecting the first sleeve to the second sleeve.

$7^{th}$ clause: The chassis according to the $6^{th}$ clause, wherein the crossmember is configured to be attached to the first and second arm through an interlocking coupling interface provided to the crossmember, the first arm, and to the second arm.

$8^{th}$ clause: The chassis according to the $7^{th}$ clause, wherein the interlocking coupling interface comprises a female counterpart provided to the first and second arm.

$9^{th}$ clause: The chassis according to the $8^{th}$ clause, wherein the female counterpart is an opening.

$10^{th}$ clause: The chassis according to the $7^{th}$ clause, the $8^{th}$ clause, or the $9^{th}$ clause, wherein the interlocking coupling interface comprises a male counterpart provided to the crossmember.

$11^{th}$ clause: The chassis according to the $10^{th}$ clause, wherein the male counterpart is provided to the first or second sleeve or both.

$12^{th}$ clause: The chassis according to any one of the preceding clauses, wherein the crossmember is configured to connect the first arm to the second arm so as to form an A-frame of an H-frame chassis.

13th clause: A roll container comprising a first pair of casters arranged at a distance from one another in the longitudinal dimension of the roll container, a first side wall attached between the first pair of casters, a second pair of casters arranged at a distance from one another in the longitudinal dimension of the roll container, and a second side wall attached between the second pair of casters and arranged at a distance from the first side wall in the transversal dimension of the roll container, the roll container also comprising a chassis according to any one of the preceding clauses connecting the casters to each other.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

| No. | Element |
| --- | --- |
| 100 | chassis |
| 110 | crossmember |
| 111 | first sleeve |
| 112 | second sleeve |
| 113 | body |
| 121 | first arm |
| 122 | second arm |
| 123 | slot |
| 124 | hole |
| 200 | side wall |
| 201 | vertical profile |
| 300 | base |
| 410 | rigid caster |
| 411 | fork |
| 412 | wheel |
| 413 | bracket |
| 414 | pin |
| 415 | key |
| 416 | tip |
| 417 | top plate |
| 418 | hole |
| 419 | nut |
| 420 | swivel caster |
| 421 | wheel plate |
| 422 | fork |
| 423 | wheel |

The invention claimed is:

1. A caster assembly for a roll container, the caster assembly comprising:
   a caster comprising a fork and
   a pin configured to act as a hinge pin of a pivotable side wall of said roll container, where
   the pin is configured to be repeatedly attached to and removed from the fork so as to attach a chassis of the roll container to the fork.

2. The caster assembly according to claim 1, wherein the caster assembly comprises an interlocking coupling interface between the fork and the pin.

3. The caster assembly according to claim 2, wherein the fork and the pin comprise cooperating coupling elements which form the interlocking coupling interface.

4. The caster assembly according to claim 1, wherein:
   the fork comprises a top plate, and wherein
   the pin comprises a tip at one end of the pin and, configured to penetrate a hole in the chassis and to be fixed to the fork.

5. The caster assembly according to claim 4, wherein:
   the top plate of the fork comprises a hole, and wherein
   the tip is configured to enter the hole of the top plate so as to be fixed to the fork.

6. The caster assembly according to claim 4, wherein:
   the tip is threaded, and wherein
   the pin comprises a key configured to engage a corresponding tool for tightening the pin against a corresponding threaded receptive member on the fork.

7. The caster assembly according to claim 6, wherein the key is configured to engage with a wrench.

8. The caster assembly according to claim 6, wherein:
   the hole of the top plate is threaded; or the hole of the top plate is blind, whereby the pin is fixed to the fork with a nut on the underside of the top plate.

9. The caster assembly according to claim 1, wherein the caster is a rigid caster.

10. A chassis for a roll container, the chassis comprising:
a first arm and
a second arm, where
both the first and the second arm are attached to the fork of a respective first and second caster assembly according to claim 1.

11. The chassis according to claim 10, wherein:
the top plates of the forks each comprise a bracket and wherein
the arms are held against the top plates by the brackets enclosing the arms.

12. The chassis according to claim 10, wherein the arms each comprise a hole through which the pin is configured to extend.

13. The chassis according to claim 11, wherein the chassis is an A-frame or an H-frame chassis.

14. A roll container comprising:
a chassis according to claim 10,
a first side wall attached at one end to a first caster assembly and at a second end to another caster, and
a second side wall attached at one end to a second caster assembly and at a second end to another caster.

15. The roll container according to claim 14, wherein:
the first and second caster assemblies at the one end of the side walls are those of rigid casters and wherein
the casters at the second end of the side walls are swivel casters.

16. The roll container according to claim 14, wherein the first and second side wall each comprise a hollow vertical profile configured to engage with the pin so as to form a rear hinge of the roll container.

17. The roll container according to claim 14, wherein the front end of the chassis is supported by wheel plates of the casters so as to allow relative sliding movement between the chassis and the swivel caster.

18. The roll container according to claim 17, wherein the wheel plates of the casters are elongated in a direction transverse to the direction of orientation of the side walls so as to create a horizontal degree of freedom for the side walls to be turned about the rear hinge towards each other at the front of the roll container.

* * * * *